July 17, 1956 W. BERBERICH 2,754,826
DEVICE FOR INTERLOCKING LOOSE LEAVES
Filed Oct. 21, 1952 3 Sheets-Sheet 1

INVENTOR:
WILLI BERBERICH
By: Young, Emery & Thompson
Attys.

July 17, 1956  W. BERBERICH  2,754,826
DEVICE FOR INTERLOCKING LOOSE LEAVES
Filed Oct. 21, 1952  3 Sheets-Sheet 2
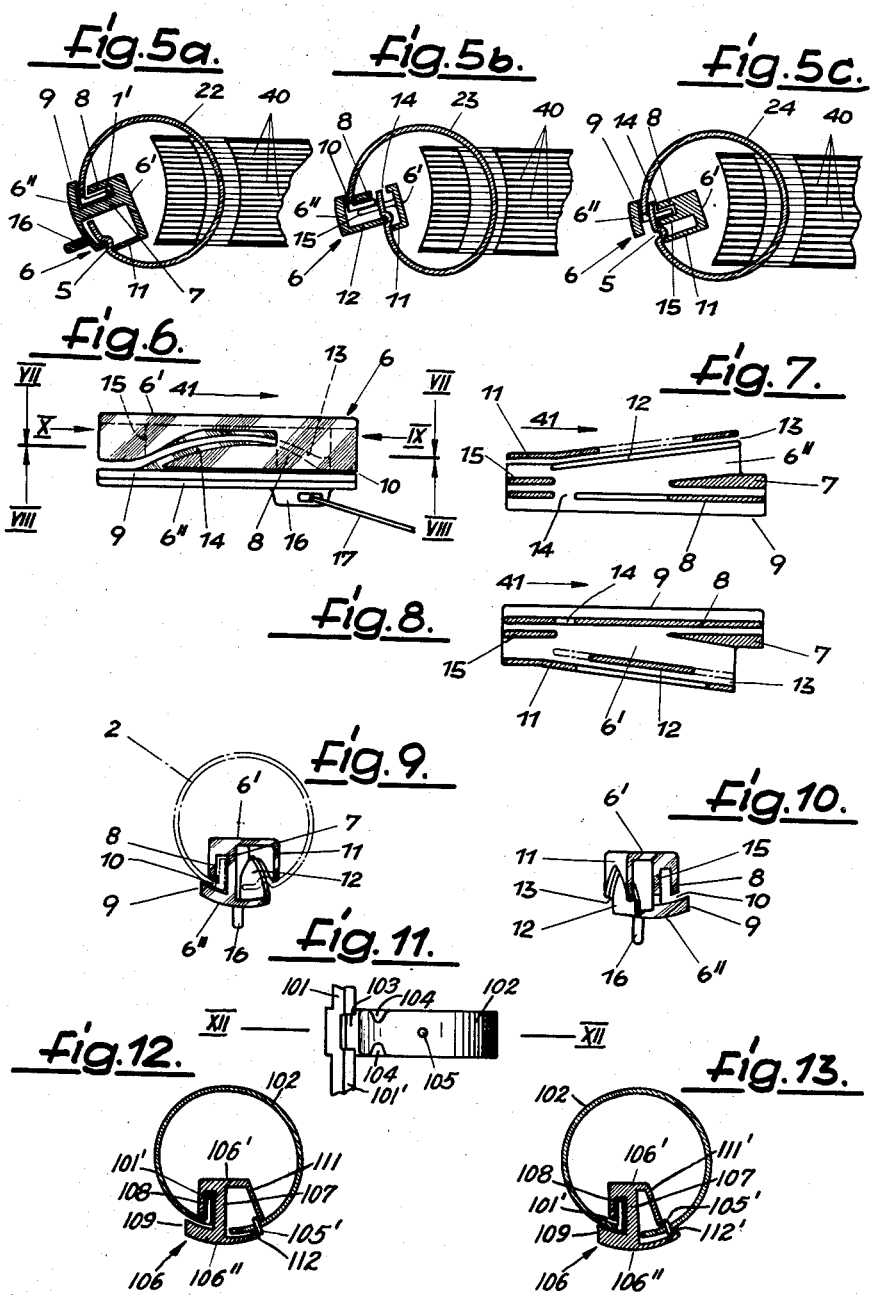
INVENTOR:
WILLI BERBERICH
By Young, Emery & Thompson
Attys.

July 17, 1956 W. BERBERICH 2,754,826
DEVICE FOR INTERLOCKING LOOSE LEAVES
Filed Oct. 21, 1952 3 Sheets-Sheet 3
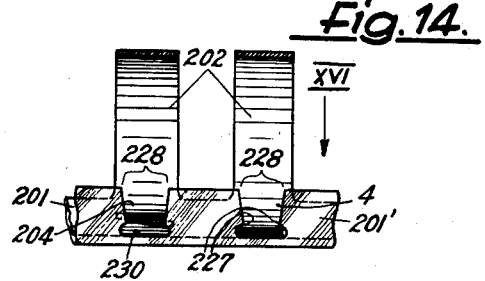
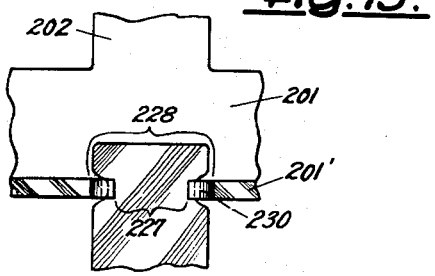
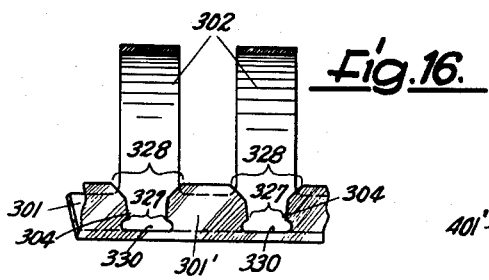
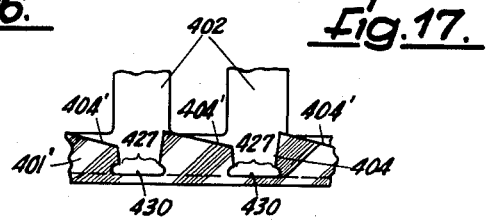
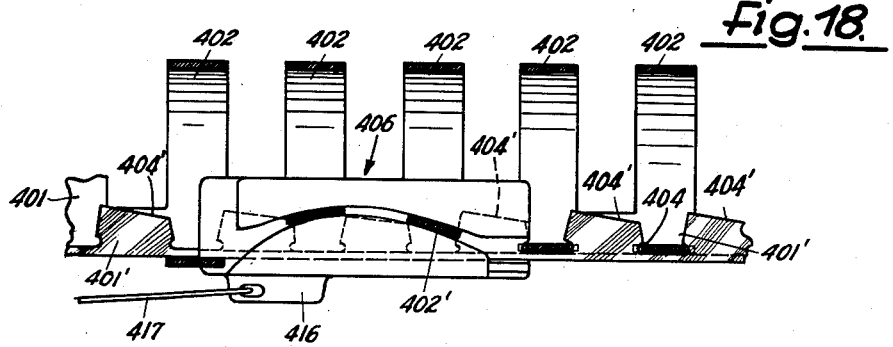
INVENTOR:
WILLI BERBERICH
By: Young, Emery & Thompson
Attys.

United States Patent Office 2,754,826
Patented July 17, 1956

2,754,826

DEVICE FOR INTERLOCKING LOOSE LEAVES

Willi Berberich, Heilbronn, Wurttemberg, Germany

Application October 21, 1952, Serial No. 316,014

Claims priority, application Germany October 22, 1951

8 Claims. (Cl. 129—1)

The invention relates to a device for interlocking loose leaves particularly a device consisting of open rings made of springy, flat materials, the rings which in parallel relation to one another being arranged with one of their ends spaced from one another on a connecting bar in a rectangular relation thereto.

Devices of this kind are usually made of thermoplastic materials and rolled up from a blank formed as a comb. In the known devices of this kind the interlocking is brought about by rolling the ring ends over the connecting bar. For bringing in and lifting out loose leaves made of paper, for example, the rings are spread by hand.

An object of the invention is to provide a device of the kind in question, the rings of which can be completely closed by interlocking means.

Another object of the invention is to provide means permitting an easy closing and opening of the interlocking.

Another object of the invention is to provide means to restrict the range of motion of the means of opening and closing the interlocking.

Figure 1:
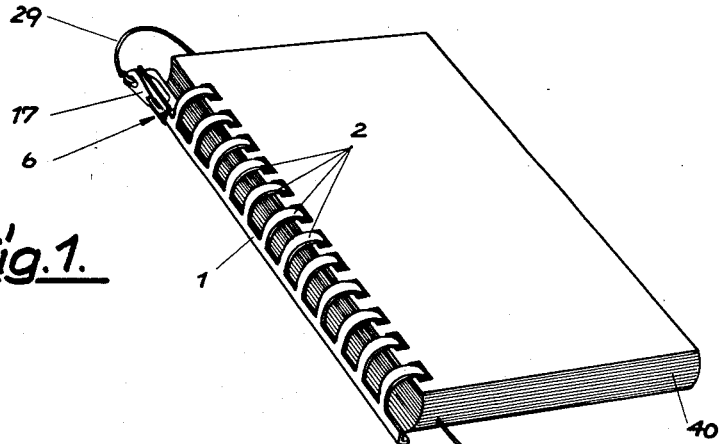
Figure 2:
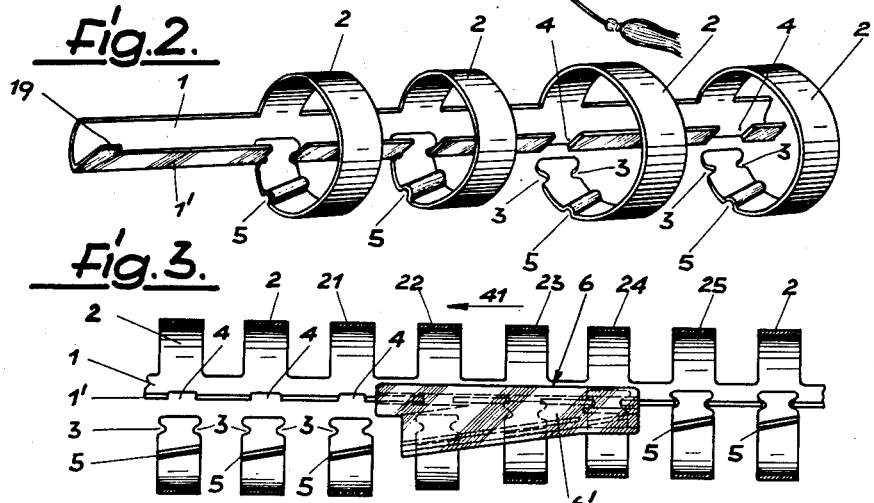
Figure 3:
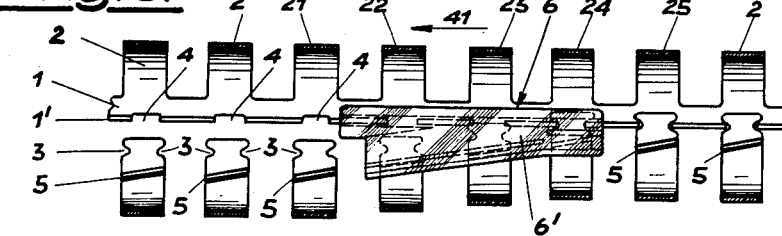
Figure 4:
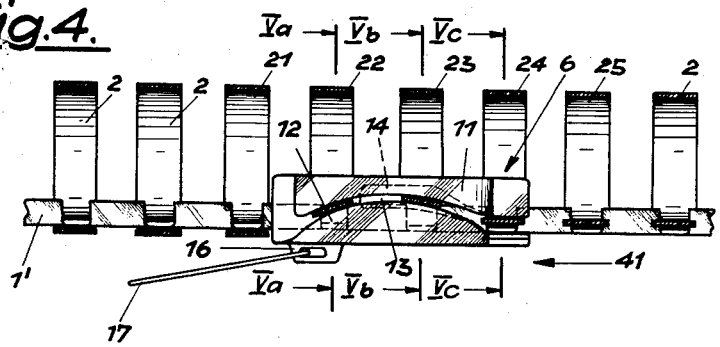

The invention will be better understood from the following description with reference to the accompanying drawings, illustrating the invention by way of one example only. In the drawings Fig. 1 is a perspective illustration of a looseleaf book provided with a device according to the invention, Fig. 2 is an enlarged perspective illustration of a part of the device, in which some rings are closed, that is to say latched, Fig. 3 is a plan view, partially in sectional view, of a device according to the invention, wherein means for closing the ring are illustrated, Fig. 4 is a side view, partially in section, of the device illustrated in Fig. 3, Figs. 5a, 5b and 5c are sectional views of the device according to Figs. 3 and 4 taken along lines Va—Va, Vb—Vb, and Vc—Vc respectively in Fig. 4, Fig. 6 is a side view of the means of closing the rings seen from the side opposite the side illustrated in Fig. 4, Figs. 7 and 8 are sections shown in Fig. 6 through the means of closing the rings, the illustrations showing the section indicated in Fig. 6 seen in two directions, that is to say Fig. 7 according to the arrows VII—VII in Fig. 6, and Fig. 8 according to the arrows VIII—VIII in Fig. 6, Fig. 9 is a view of the means of closing the rings seen in the direction of the arrow in Fig. 6, Fig. 10 is a view of the means of closing the rings seen in the direction of the arrow X in Fig. 6, Fig. 11 is a top view of a ring and the adjacent parts of the connecting bar illustrating an example of design of the guiding members having rings for grasping the means of latching, Fig. 12 is a cross section through a ring and a connecting bar along lines XII—XII in Fig. 11, the cross section being completed by a cross section of the means of latching the rings, Fig. 13 is a cross section corresponding to the cross section according to Fig. 12 but with a slightly modified example of design of the means latching the rings, Fig. 14 is a partially sectioned partial view of the connecting bar and the rings, in which the designing of the connecting bar is shown, permitting the latching of the rings into the connecting bar, Fig. 15 is a detail of Fig. 14 in a larger scale, seen in the direction of the arrow XVI in Fig. 14, Fig. 16 is a partially sectioned partial view of the connecting bar and the rings, in which another design of the connecting bar is shown, permitting the latching of the rings into the connecting bar, Fig. 17 is a partial view of the connecting bar and the rings, in which a third design of the connecting bar is shown, permitting the latching of the rings into the connecting bar, Fig. 18 is a partially sectioned partial view of the connecting bar and the rings corresponding to Fig. 17, in which the means of latching the rings into the connecting bar are illustrated, too.

The device is suited for interlocking loose leaves made of paper etc. and substantially consists of a connecting bar 1 and rings 2 adjacent to this connecting bar 1 which are at right angles to the bar and parallel to one another, the rings preferably being integral with the connecting bar. The connecting bar 1 and the rings 2 preferably are made of springy, flat materials, for instance of thermoplastics.

The connecting bar 1 has a somewhat V-shaped cross section. The ring ends have notches 3 by means of which they can be latched into recesses 4 disposed from each other corresponding to the spaces between the rings in the side 1' of the connecting bar 1 which do not carry the rings.

Owing to this design it is possible to latch and to unlatch the rings with their notches 3 by hand into respective recesses 4. The latching for locking the device is done when loose leaves 40 are filed on the rings and the unlatching is accomplished, when loose leaves 40 are taken off the device and other leaves should be filed.

The rings are so designed that they try to unlatch due to their inherent springiness, and the latching of the rings is done successively or simultaneously counteracting this springiness, the notches of the rings being inserted in the respective recesses, in which they are kept locked.

The rings have particular guiding members, if particular means are provided for this latching.

In a first example of design according to Figs. 2 to 10 the rings, from the notches 3 at a distance toward the ring roots, have groove-like recesses 5 or notches running parallel to one another in an acute angle to the longitudinal direction of the connecting bar 1. The particular means of latching and unlatching the ring ends may consist of a slide designed and acting like the slide of a zip fastener. The slide is adapted to be pushed along the connecting bar 1 and the groove-like recesses 5 of the ring ends, and furthermore adapted to latch the ring ends into the recesses 4, if pushed along one direction, and to unlatch the ring ends from the recesses 4, if pushed along the other direction.

The slide substantially consists of a cover 6', a bottom 6" being curved corresponding to the curvature of the rings 2, and a bridge 7 connecting the cover 6' and the bottom 6" with each other at their one end. The bridge 7 may run between the side 1' of the connecting bar 1 provided with the recesses 4, on the one hand, and the ends of the ring 2, on the other hand, if the ring ends are not latched into the side 1'. The cover 6' of the slide 6, furthermore, has side walls 8 and 11, arranged rectangular to the cover. The one side wall 8 runs parallel to the longitudinal direction of the connecting bar, the second side wall being arranged in an acute angle to the longitudinal direction, so that the vertex of the acute angle is directed in an opposed direction to the said bridge. The lower edge of the first side wall 8 arranged parallel to the longitudinal direction of the connecting bar 1 is arranged parallel to the adjacent edge 9 of the bottom 6″, in order to form a slit 10 adapted to receive the side of the connecting bar 1 carrying the rings 2 so that the side 1′ of the connecting bar 1 having the recesses 4 is parallel to the first side wall 8 within the slide 6. The bottom 6″ of the slide 6 is provided with a side wall 12, running parallel to the second side 11 of the cover 6′. The lower edge of the second side wall 11 of the cover 6′ and the upper edge of the side wall 12 of the bottom 6″ are curved substantially corresponding to a slender circular arc running convex toward the cover 6′ so that a slit 13 is formed adapted to receive the ring ends. The distance of the edge of the second side wall 11 of the cover 6′ and the said side wall 12 of the bottom 6″ from each other is such that the guiding members 5 of the ring ends are guided by the edges of the slit 13.

The first side wall 8 of the cover 6′ is provided with another slit 14 starting from the end of the side wall 8 adjacent to the bridge and being substantially curved like the slit 13 on the opposite side of the slit 14, but substantially only running up to the vertex of the curvature.

When looking at the rings 21, 22, 23, 24, 25 in Figs. 3 and 4, it is to be seen that the ring 21 is opened and that the slide 6 approaches it in the direction of the arrow 41, if the device is to be locked. The slide 6 has already taken hold of the ring 22 (Fig. 5a). The course of the slit 13 causes every ring, as the rings 22, 23, 24 show in Figs. 3 to 5, not only first to be lifted beyond the edge of the side 1′ of the connecting bar 1 when locking the device, but also to be slid beyond this edge with a greater curve in the ring so that at a further passing of the said ring through the slide 13 the notches 3 are forced into the recesses 4. This is brought about by the rear section of the slit 13 sloping off in the direction of motion (arrow 41 in Figs. 3, 4, 6, 7, 8) of the slide. Since this slit 13 is still relatively far distant from the extreme ring ends, on the other side of the slide 6 the slit 14 is provided, beginning about the middle of the slide 6 and ending toward the rear bottom. Particularly from the Fig. 5b and 5c is to be seen that this slit 14 is entered by the extreme end of the rings, as these are pulled toward the connecting bar 1, and room must be provided for them owing to the acting of the slit 13 on the slanted groove-like recesses 5. Moreover this slit 14 is adapted to force the notches 3 into the recesses 4 without fail. For the same purpose a bridge 15 (Figs. 5c, 7, 8, 10) is devised, which is arranged at the cover 6′ in the rear end of the slide 6.

Appropriately the slide 6 is still provided with a nose 16 (Figs. 4, 5a, 9, 10) at which a handle 17 is fixed.

Figs. 11 to 13 illustrate a modification in which on a bar 101 rings 102 are provided similar to the bar and rings as shown in Figs. 1 to 10. The side 101′ of the bar 101 is also provided with notches 103 in which recesses 104 the rings 102 are guided similar to Figs. 1 to 10. The slide 106 in Figs. 11 to 13 is also formed similar to slide 6 of Figs. 1 to 10 and the parts 106′, 106″, 107, 108, 109, 111 and 112 correspond to the same parts as in Figs. 1 to 10 having the same reference characters less 100.

In the form of Figs. 11 to 13 contrary to the form of Figs. 1 to 10 pins 105′ are provided at a distance from the ring ends on both the outer and inner surface of the rings, which pins 105′ serve as guiding members instead of the groove-like recesses 5 and which, of course, may consist of one piece. In this case the slide 106 is substantially designed just as if the ring ends would have groove-like recesses 5, there are only the side walls 111 and 112 of the slide so arranged that they engage at sides of the pins 105′ opposite to each other. Figs. 12 and 13 illustrate two different examples of design. These two Figs. 12 and 13 differentiate from each other in that in Fig. 12 the pins 105′ grip the side walls 111 whereas they contact the side walls 112 and in Fig. 13 the pins 105′ grip the side walls 112′ adjacent the side walls 111′.

It is, furthermore, appropriate, if the connecting bar 101 has a stop 119 at the one end of a side, preferably at the side 101′ guiding the slide 106, which limits the way of the slide 106 in one direction. This stop is appropriately arranged at a distance as much as a slide length from the adjacent ring 102.

Particularly by using a connecting bar 1 not provided with a stop 19 it is appropriate to join to the handle 17 of the slide 6 a ribbon, a tassel 29 and so on which may be used as a book-mark and renders the losing of the slide more difficult (Fig. 1).

The shape of the recesses 4 in the side 1′ of the bar 1 may be different. It is evident that the width of the recesses 4 is smaller than the width of the rings, since the rings enter the recesses 4 with their notches 3. By way of example the flanks of the recesses 4 may run parallel to one another as will be seen particularly in Fig. 4.

But it is also possible to secure additionally the locking of the ring ends, brought about by latching them into the recesses of the connecting bar, against a spontaneous loosening and to make the bringing of the ring ends into the recesses 204 of the connecting bar easier. Figs. 14 to 18 illustrate three different designs of the configuration of the recesses. The parts of the devices illustrated in Figs. 14 to 18 are designed with similar reference characters as to corresponding parts in Figs. 1 to 10. In Figs. 14 and 15 the elements are identified in the two hundreds, in Fig. 16 in the three hundreds, and in Figs. 17 and 18 in the four hundreds. The purpose of Figs. 14 to 18 set out herebefore is obtained if the distance between the flanks of the recesses 204 of the bar 201 at least at one point 227 between the edge of the bar 201 and the end 230 of the recess is smaller than the width of the rings 202 at the notches, Figs. 14 and 15. By way of example this can be brought about by the flanks of the recesses 204 from the edge of the bar from access 228 up to the narrowest passage 227, running convergently as illustrated. The same applies to the recess 304, bar 301, point 327, end 330 and ring 302 of Fig. 16, and recess 404, bar 401, point 427, end 430 and ring 402 of Figs. 17 and 18.

It is evident that in this case the ring ends must be brought into the recesses somewhat slanting as illustrated in Fig. 14. This slanting position is automatically achieved by using a slide 406, as may be seen particularly from the ring 402′ illustrated in Fig. 18, though this figure illustrates another design than Fig. 14.

In order to make the engagement of the ring ends into the recesses 404 easier, particularly if a slide is used, the recesses 404, as illustrated in Figs. 17 and 18, are enlarged in the direction in which the slide 406 is moved when the ring ends latch, that is to say in the direction of the arrow 41. Every enlargement of a recess 404 is then limited by a portion 404′ of one flank of the recess 404. This portion 404′ extends outward from the interior of the recess 404 slanting in the direction of the arrow 41, and has its one end near the narrowest passage 427 of the recess 404. The angle which the portion 404′ forms with the edge of the bar is smaller than the angle between the other flank of the recess 404 and the edge of the bar 401.

Having now described my invention, what I claim is:

1. A loose leaf binder comprising a bar composed of flat and springy material and having a plurality of open substantially ring-shaped members at one end integral with one side of the bar and arranged parallel to each other in spaced relation and rectangular to said bar and adapted to receive loose leaves provided with openings along one longitudinal side thereof, the second side of the bar being provided with recesses arranged in spaced relation corresponding to the spaced relation of the rings, each free end of the rings being provided with a pair of notches on either side adapted to be latched into the recesses of the bar, and means for latching and unlatching the binder consisting of guiding members provided on each ring and arranged opposite to one another on the inner and the outer side of each ring at a greater distance from the free end than the notches, and a slide fastener permanently mounted on the bar adapted to be pushed along the bar and the guiding members of the rings to latch the ring ends into the recesses when being pushed in one direction, and to unlatch the ring ends from the recesses when pushed in the other direction, said slide fastener consisting of a cover, a bottom curved portion corresponding to the curvature of the rings, and a bridge connecting the cover and the bottom portion at their one end and being adapted to pass between the side of the bar provided with recesses and the ring ends when not latched, side walls of the cover arranged rectangular to the cover, the one side wall parallel to the longitudinal direction of the bar, the second side wall arranged in an acute angle to the first side wall, the vertex of the acute angle being directed in the direction opposite to the said bridge, and the lower edge of the first side wall arranged parallel to the longitudinal direction of the bar being arranged parallel to the adjacent edge of the bottom to form a slit adapted to receive the side of the bar carrying the rings so that the side of the bar provided with the recesses stands parallel to the first side wall within the slide.

2. A loose leaf binder comprising a bar composed of flat and springy material and having a plurality of open substantially ring-shaped members at one end integral with one side of the bar and arranged parallel to each other in spaced relation and rectangular to said bar and adapted to receive loose leaves provided with openings along one longitudinal side thereof, the second side of the bar being provided with recesses arranged in spaced relation corresponding to the spaced relation of the rings, each free end of the rings being provided with a pair of notches on either side adapted to be latched into the recesses of the bar, and means for latching and unlatching the binder consisting of guiding members provided on each ring and arranged opposite to one another on the inner and the outer side of each ring at a greater distance from the free end than the notches, and a slide fastener adapted to be pushed along the bar and the guiding members of the rings to latch the ring ends into the recesses when being pushed in one direction, and to unlatch the ring ends from the recesses when pushed in the other direction, said slide consisting of a cover, a bottom curved portion corresponding to the curvature of the rings, and a bridge connecting the cover and the bottom portion at their one end and being adapted to pass between the side of the bar provided with recesses and the ring ends when not latched, side walls of the cover arranged rectangular to the cover, the one side wall parallel to the longitudinal direction of the bar, the second side wall arranged in an acute angle to the first side wall, the vertex of the acute angle being directed in the direction opposite to the said bridge, the lower edge of the first side wall arranged parallel to the longitudinal direction of the bar being arranged parallel to the adjacent edge of the bottom to form a slit adapted to receive the side of the bar carrying the rings so that the side of the bar provided with the recesses stands parallel to the first side wall within the slide, the bottom of the slide being provided with a side wall parallel to the second side wall of the cover, the lower edge of the second side wall and the upper edge of the said side wall of the bottom being curved substantially corresponding to a slender circular arc convex toward the cover to form a slit adapted to receive the ring ends, the distance of the edge of the second side wall of the cover and the said side wall of the bottom being so arranged that the guiding members of the ring ends are guided by the edge of the slit, the first side wall of the cover being provided with another slit so arranged as to start from the end of the side wall opposite to the bridge, and being substantially curved like the slit on the opposite side of the slide substantially running up to the vertex of the curvature only.

3. A loose leaf binder according to claim 2, wherein each of the rings of greater distances from the free ring ends than the notches is provided with an undulated recess adapted to serve as guiding members, and whose elevations are arranged on the inner side of the rings and whose grooves are on the outer side of the rings, the said recesses being arranged in equal distances from the ring ends slanting to a generating line of the cylinder represented by the rings and parallel to each other, the upper edge of the side wall of the bottom and the lower edge of the second side wall of the cover being arranged in a relationship, permitting the upper edge of the side wall of the bottom to enter the grooves of the recesses and the lower edge of the second side wall of the cover to press the grooves of the recesses on the upper edge of the side wall of the bottom.

4. A loose leaf binder according to claim 2, wherein each of the rings of greater distances from the free ring ends than the notches is provided with a pin, adapted to serve as guiding members and projecting over the inner and the outer surfaces of the ring, the upper edge of the side wall of the bottom and the lower edge of the second side wall of the cover being arranged in a relationship, permitting to guide the pin so that the one edge leans against the one projecting part of the pin on the one side of the same, and the other edge against the other projecting part of the pin on the other side of the same.

5. A loose leaf binder according to claim 2, in which the distance of the flanks of every recess of the bar is smaller than the width of the rings at the notches at least at one point between the edge of the bar and the end of the recess.

6. A loose leaf binder according to claim 2, in which the distance of the flanks of every recess of the bar is smaller than the width of the rings at the notches at least at one point between the edge of the bar and the end of the recess, the flanks of the recesses of the bar being arranged in a relationship convergent from the bar edge toward the narrowest point.

7. A loose leaf binder according to claim 2, in which the recesses of the one side of the bar are enlarged in the direction in which the slide is moved so that the ends of the rings may be latched into the recesses, each enlargement being limited by a portion of a flank of a recess and the portion of a flank having one end near the narrowest point of the recess and being arranged at an angle to the edge of the side, the angle being smaller than the angle between the other flank of the recess and the edge of the bar.

8. A loose leaf binder according to claim 2, wherein the side of the bar having the recesses has a stop at the end at which the slide is located, when the ring ends are latched into the recesses, the ring adjacent to the stop being arranged at a distance from the stop which is about one length of the slide.

References Cited in the file of this patent

UNITED STATES PATENTS

| | | |
|---|---|---|
| 1,820,595 | Brooks | Aug. 25, 1931 |
| 2,210,106 | Tauber | Aug. 6, 1940 |
| 2,234,045 | Emmer | Mar. 4, 1941 |
| 2,459,541 | Russell | Jan. 18, 1949 |
| 2,502,493 | Trussell | Apr. 4, 1950 |
| 2,617,423 | Miller | Mar. 11, 1952 |